United States Patent
Yun et al.

(10) Patent No.: US 7,495,901 B2
(45) Date of Patent: Feb. 24, 2009

(54) LOCKING MECHANISM FOR FLAT DISPLAY DEVICE

(76) Inventors: Su-Hyoun Yun, Room 201, 94-3 Sunae-Dong, Bundang-Gu, Seongnam-Si, Gyeonggi-Do 463-020 (KR); Sung-Hyun Kim, 101-203 Hosu-imkwang Apt., 33 of Songpa1-Dong, Seoul 138-171 (KR); Sang-Hoon Mun, Moamiraedo Apt., Baekhyun Maeul, Dongbaek-Dong, Giheung-Gu, Yongin-Si, Gyeonggi-Do (KR) 446-911

( * ) Notice: Subject to any disclaimer, the term of this patent is extended or adjusted under 35 U.S.C. 154(b) by 79 days.

(21) Appl. No.: 11/761,566

(22) Filed: Jun. 12, 2007

(65) Prior Publication Data
US 2008/0218953 A1  Sep. 11, 2008

(30) Foreign Application Priority Data
Mar. 7, 2007 (KR) ..................... 10-2007-0022271

(51) Int. Cl.
H05K 5/00 (2006.01)
H05K 7/00 (2006.01)
(52) U.S. Cl. ..................... 361/683; 361/679; 361/680; 361/681
(58) Field of Classification Search ......... 361/679–681, 361/683; 70/58, 67, 69–74

See application file for complete search history.

(56) References Cited

U.S. PATENT DOCUMENTS

| 6,517,129 B1 * | 2/2003 | Chien et al. ............... 292/251.5 |
| 6,659,516 B2 | 12/2003 | Wang et al. |
| 6,965,512 B2 * | 11/2005 | Huang et al. ................. 361/683 |
| 2006/0038415 A1 * | 2/2006 | Liu et al. .................. 292/251.5 |
| 2007/0096474 A1 * | 5/2007 | Ye et al. ..................... 292/121 |
| 2007/0133156 A1 * | 6/2007 | Ligtenberg et al. .......... 361/681 |

* cited by examiner

Primary Examiner—Jayprakash N Gandhi
Assistant Examiner—Anthony M Haughton

(57) ABSTRACT

Provided is a locking mechanism for a flat display device. The locking unit for a single axis rotation flat display device in which an upper body and a lower body are coupled to each other by a rear main hinge, includes: a latch member movable on a guide disposed in the upper body, a locking hole formed in the latch member and a bent portion slantingly bent at a lower end of the latch member which is made of a ferromagnetic material. In a retracted state, the latch member is substantially disposed within the upper body, while in deployed state the latch member protrudes therefrom. A restoration member provides a restoration force to the latch member so as to urge it into its retracted state. A hook member hingedly coupled to the lower body. The hook member having a hook portion whose upper end engages the locking hole. a magnet is installed to or in proximity to the hook member under the hook portion. A push button protrudes from a side portion of the lower body and pushes the hook member so that the hook portion disengages the locking hole when the pushbutton is pressed.

12 Claims, 8 Drawing Sheets

LOCKING MECHANISM FOR FLAT DISPLAY DEVICE

FIELD OF THE INVENTION

The present invention relates to a locking mechanism for a flat display device.

BACKGROUND OF THE INVENTION

In general, a locking mechanism for a notebook is installed between an upper body and a lower body, which are folded or unfolded, and maintains the state where the upper body and the lower body are folded.

FIGS. 1 and 2 illustrate the structure of a conventional locking mechanism for a flat display device. Referring to FIGS. 1 and 2, the conventional locking mechanism includes a hook 31 which is coupled to an inside of a lower body 10 of a notebook, by a hinge h, the hook of bent shape rotatably protrudes toward the surface of the lower body 10, or is recessed into the lower body 10. A first magnet 32 is installed inside the lower body 10 and applies a magnetic force to the hook 31 in a direction in which the hook 31 is inserted into the lower body 10. A locking hole 33 is formed in the upper body 20, into which the hook 31 extends when it protrudes toward the surface of the lower body 10. A second magnet 34 is installed inside the locking hole 33 and applies a magnetic force to the hook 31 in a direction in which the hook 31 extends in the locking hole 33. At this time, the strength of the magnetic force of the second magnet 34 is larger than the strength of the magnetic force of the first magnet 32.

Through the above structure, as illustrated in FIG. 1, in the state where the lower body 10 and the upper body 20 are separated from each other, the hook 31 is rotated around a hinge h by the magnetic force of the first magnet 32 and accordingly, the hook 31 is maintained in the state where the hook 31 is inserted into the lower body 10. However, when the upper body 20 and the lower body 10 are closely adhered to each other and a distance between the second magnet 34 and the hook 31 is short, the hook 31 is rotated by the magnetic force of the second magnet 34 and accordingly, the hook 31 extends into the locking hole 33, as illustrated in FIG. 2.

However, in the above structure, since the hook 31 has a bent shape, when, in the state where the hook 31 extends in the locking hole 33, shock or a large magnetic force from the outside is applied in a reverse rotation direction of the hook 31, the hook 31 is rotated in a reverse direction and is separated from the locking hole 33 and accordingly, the locking state between the lower body 10 and the upper body 20 is released. Furthermore, since the hook 31 has the bent shape, the structure of the conventional locking mechanism is not rigid.

In addition, in order to enable the hook 31 to be smoothly rotated around the hinge h, a space should be provided for rotation of the hook 31, by removing all parts within a rotation radius of the hook 31 from the lower body 10 and the upper body 20. Thus, there are many restrictions that the space for rotation of the hook 31 should be provided when the lower body 10 and the upper body 20 are designed. Furthermore, since all parts within the rotation radius of the hook 31 should be removed, there is the possibility of the occurrence of defects caused by foreign substances.

In addition, the hook 31 is not rotated in any direction at a place in which the magnetic force of the first magnet 32 and the magnetic force of the second magnet 34 which are applied to the hook 31 are neutralized, and a locking operation is not performed.

SUMMARY OF THE INVENTION

The present invention provides a locking mechanism for a flat display device in which, although shock or strong magnetic force is applied from the outside, a locking operation can be positively performed in the state where an upper body and a lower body of the flat display device are folded.

The present invention also provides a locking mechanism for a flat display device in which durability is improved, offering better design options, and a locking operation can be smoothly performed.

The present invention also provides a locking mechanism which can also be applied to a swivel flat display device.

According to an aspect of the present invention, there is provided a locking mechanism for a single axis rotation flat display device, in which an upper body and a lower body are mutually coupled by a rear main hinge, the locking mechanism including: a latch member installed to ascend and descend on a guide installed inside the upper body, the latch member having a locking hole formed therein and a bent portion slantingly bent at a lower end of the latch member which is made of a ferromagnetic material, the latch member or a portion thereof being disposed in the upper body when in a retracted state, and protrudes from the surface of the upper body in a deployed state; a restoration member which applies restoration force to the latch member so as to urge the latch member from the deployed state to the retracted state. A hook member is rotateable about a hinge inside the lower body, the hook member having a hook portion at or near its upper end, the hook portion constructed to engage the locking hole. A magnet installed at the hook member under the hook portion; and a push button protruding from a side portion of the lower body and pushes the hook member so that the hook portion disengages from the locking hole.

According to another aspect of the preset invention, there is provided a locking mechanism for a swivel flat display device in which an upper body and a lower body are coupled to each other by two main hinges and the upper body is rotatable by 180 degrees about a first axis with respect to the lower body and where the top may be opened and closed relative to the lower body about a second axis, the locking mechanism including: a latch member installed to ascend and descend on a guide installed inside the upper body. The latch member having a pair of locking groves formed therein, and further having two bent portions slantingly bent at both ends of the latch member which is made of a ferromagnetic material. The latch member or a portion thereof being disposed in the upper body in a retracted state and protrudes from the upper surface or lower surface of the upper body when the latch member is in deployed state. Restoration members provide restoration forces to the latch member so as to urge the latch member from deployed state to a retracted state. A hook member is rotatable about a hinge inside the lower body, in the hook member having an hook portion at or near its upper end, the hook portion constructed to engage the locking hole. A magnet is installed at the hook member under the hook portion. A push button which protrudes from a side portion of the lower body and pushes the hook member so that the hook member engaging the locking holes can be separated from the locking holes.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Flat display devices are devices on which various information can be displayed as images. Examples include notebooks, electronic dictionaries, and personal digital assistants (PDAs) and the like. Such a flat display device includes an upper body and a lower body which are folded or unfolded. In general, a display panel on which an image is displayed is installed at the upper body and CPU, RAM, and hard disc etc. are installed at the lower body.

At this time, the flat display device can be largely classified into a single axis rotation flat display device and a swivel flat display device according to hinge coupling techniques of the upper body and the lower body. A single-axis rotation technique is a technique in which the upper body and the lower body are coupled to each other around a rear hinge and the upper body is rotated in one axis with respect to the lower body, when the top is opened and closed. A swivel technique is a technique in which the upper body and the lower body are coupled to each other by two hinges, wherein the upper body is rotatable by 180 degrees with respect to the lower body about a first axis, and the top may be opened and closed about a second axis.

The locking mechanism according to the present invention can be applied to both the single-axis rotation flat display device and the swivel flat display device, which will now be described according to embodiments.

Figure 1:
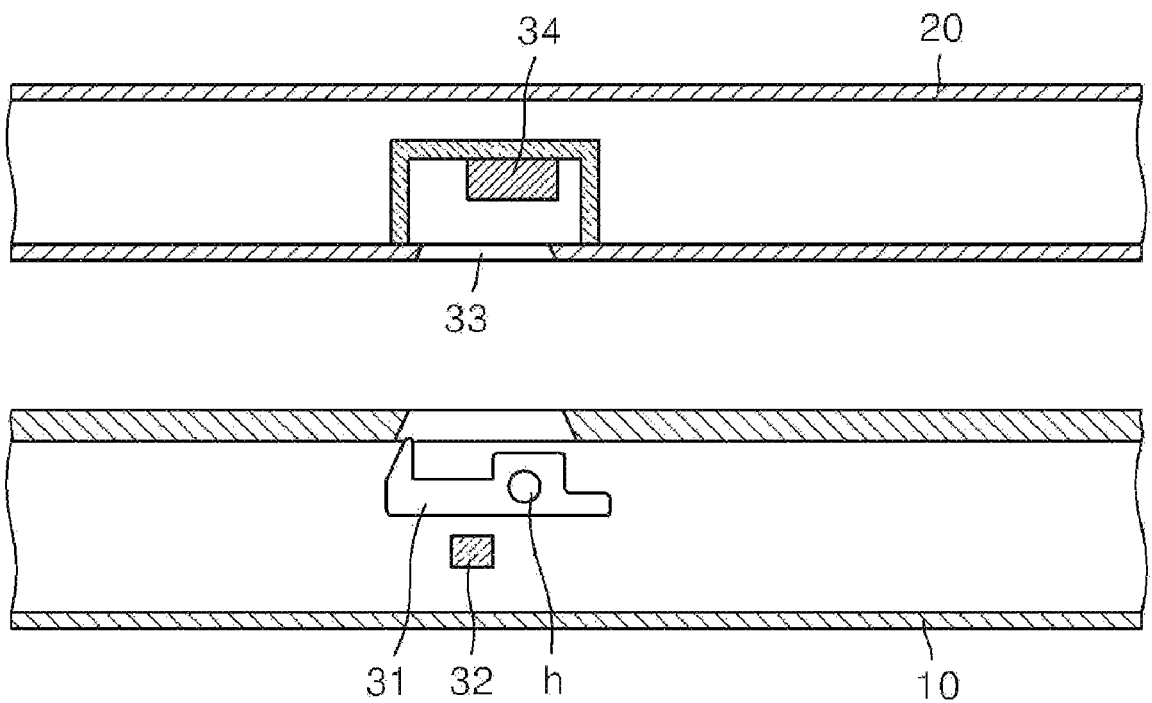
FIGS. 1 and 2 illustrate the structure of a conventional locking mechanism for a flat display device.
Figure 2:
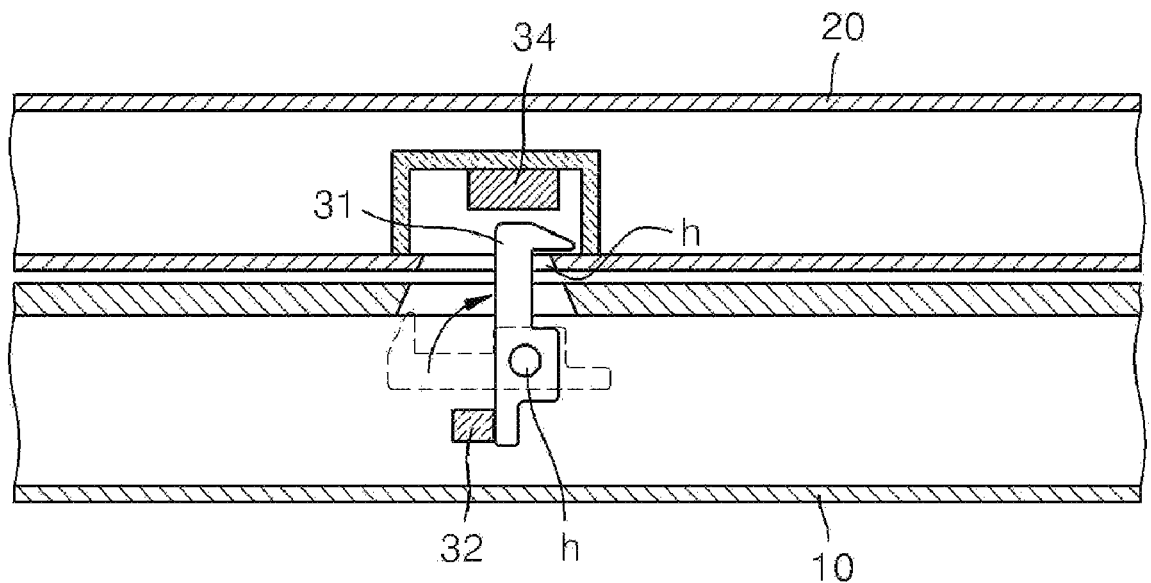
Figure 3:
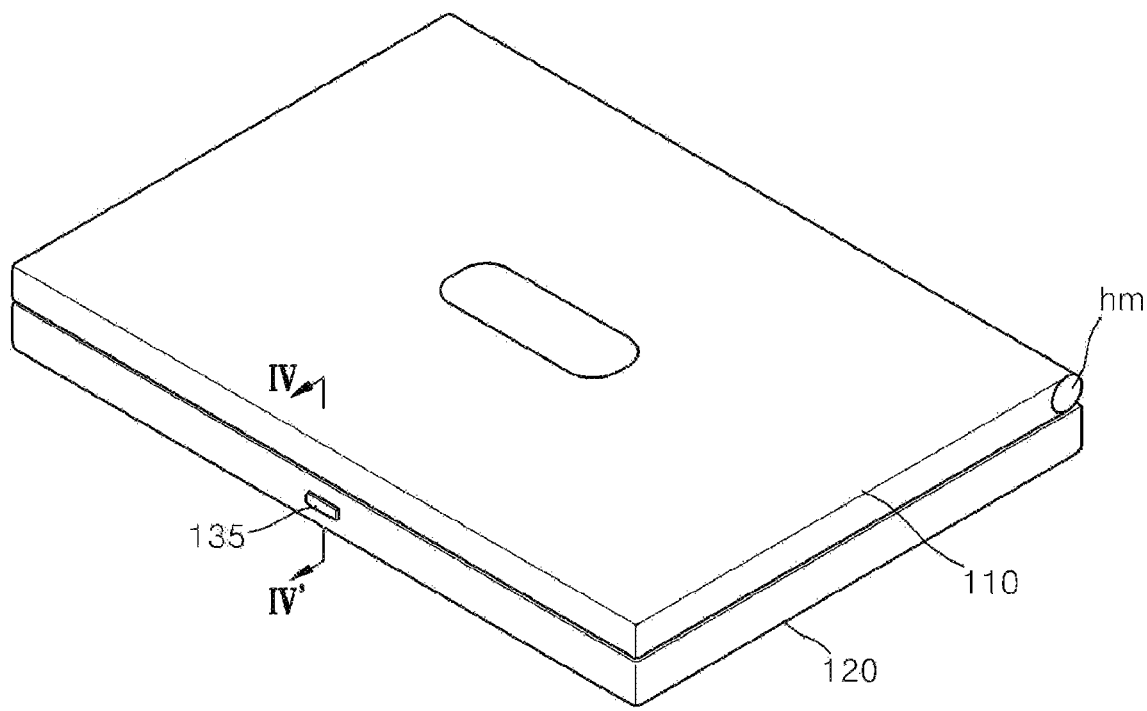
FIG. 3 is a perspective view of a locking mechanism for a single-axis rotation flat display device according to an embodiment of the present invention.
Figure 4:
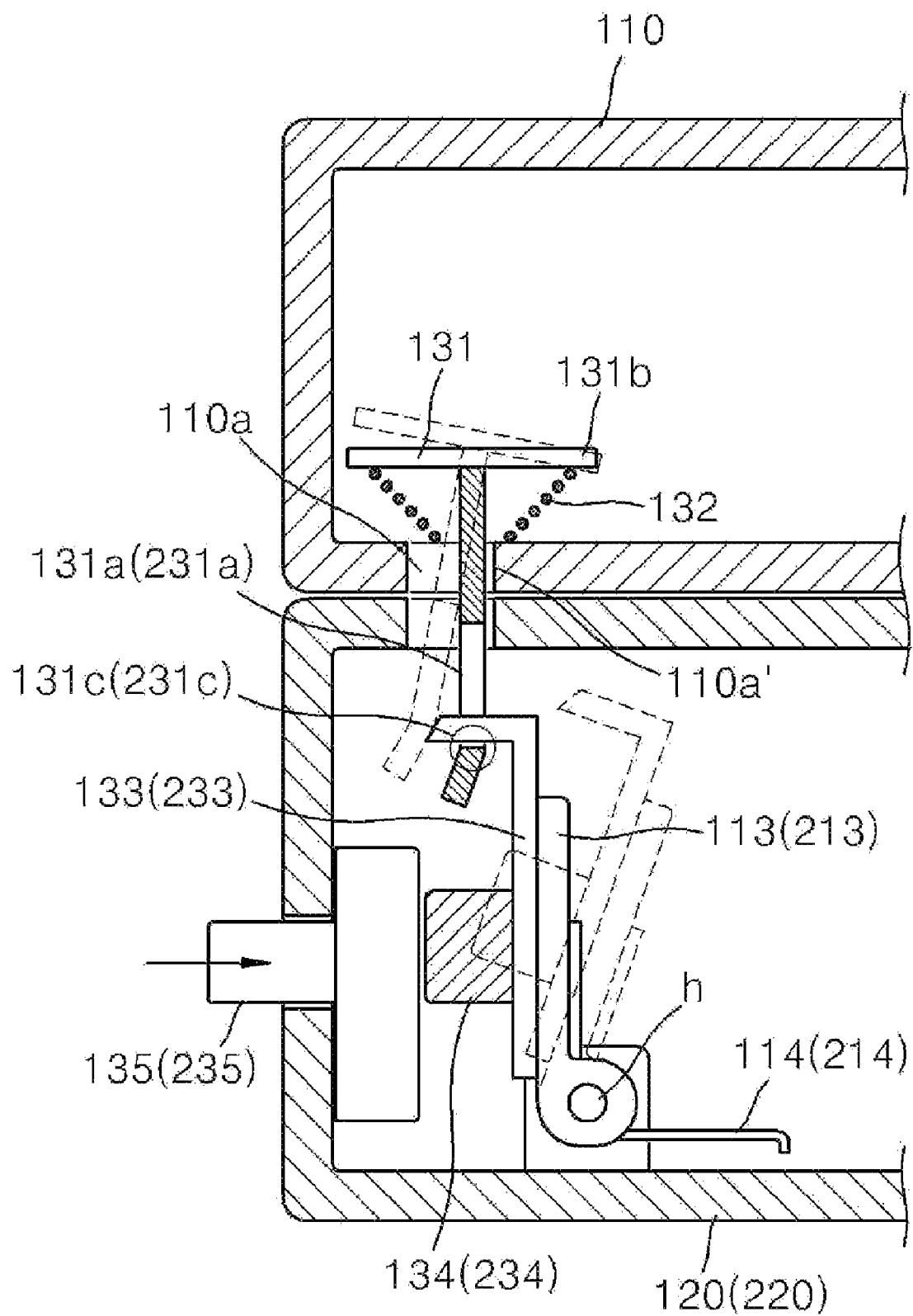
FIG. 4 is a cross-sectional view taken along line IV-IV' of FIG. 3.
Figure 5:
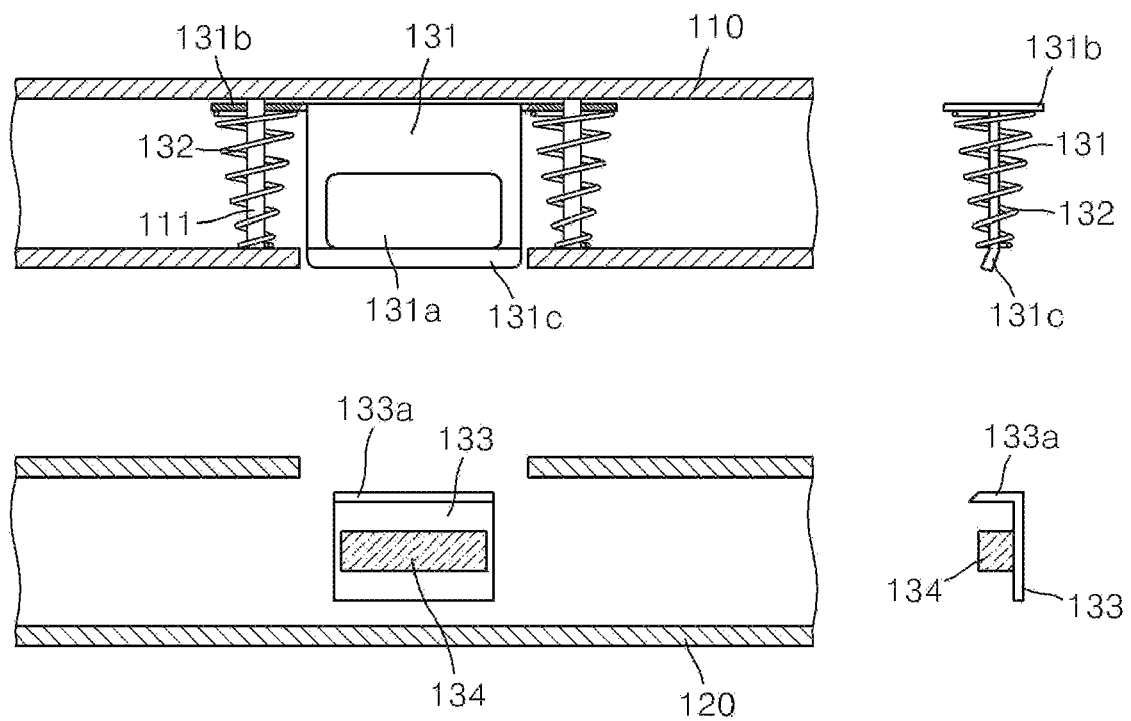
FIGS. 5 and 6 are expanded diagrams of the main structure of an upper body and a lower body in FIG. 4, for illustrating the case where a restoration member is a spring type.
Figure 6:
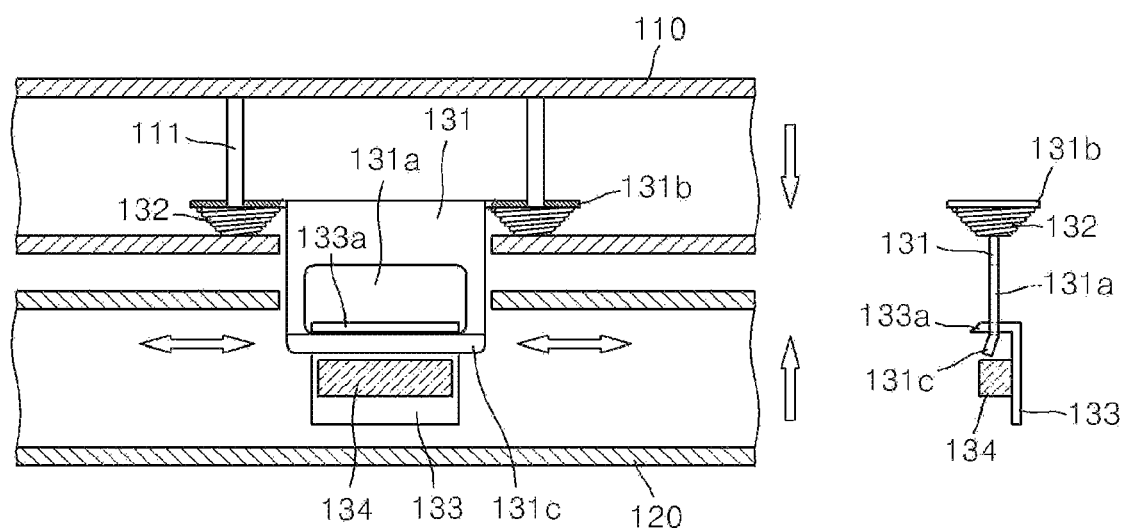
Figure 7:
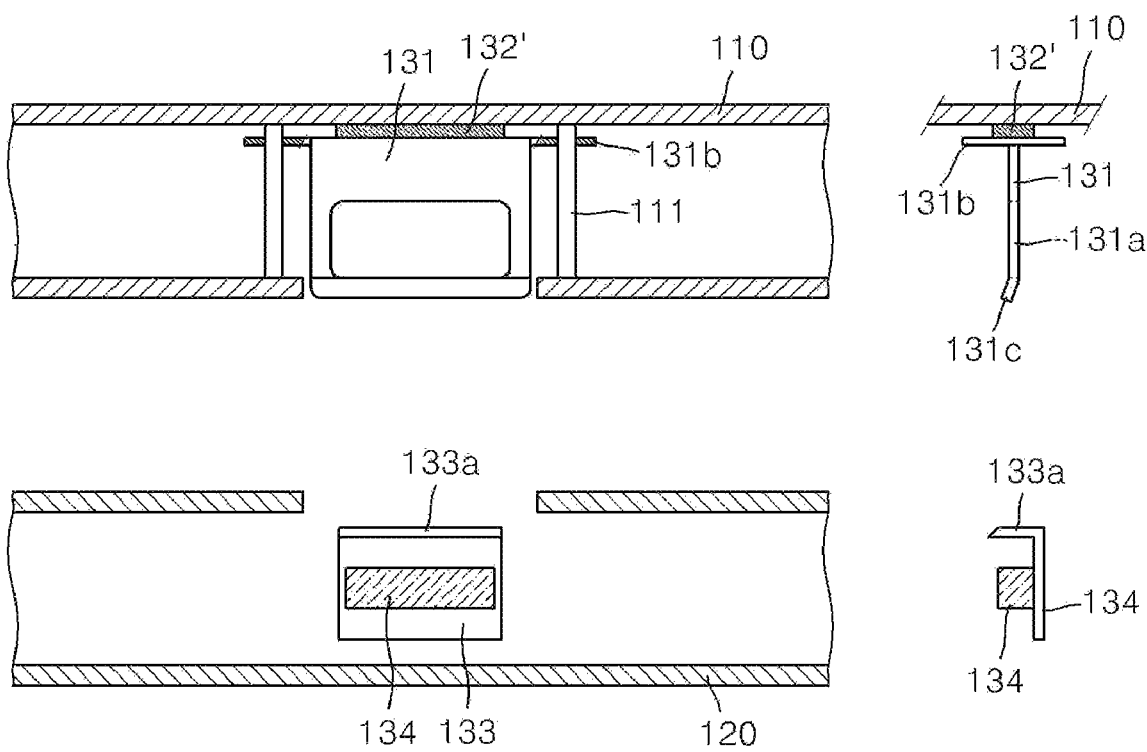
FIG. 7 is an expanded diagram of main structure of the upper body and the lower body in FIG. 4, for illustrating the case where the restoration member is a magnet type.

FIG. 3 is a perspective view of a locking mechanism for a single-axis rotation flat display device according to an embodiment of the present invention, and FIG. 4 is a cross-sectional view taken along line IV-IV' of FIG. 3. In addition, FIGS. 5 and 6 are expanded diagrams of the main structure of an upper body and a lower body in FIG. 4, for illustrating the case where a restoration member is a spring type, and FIG. 7 is an expanded diagram of the main structure of the upper body and the lower body in FIG. 4, for illustrating the case where the restoration member is a magnet type.

The locking mechanism according to an embodiment of the present invention is applied to a single-axis rotation flat display device in which an upper body 110 and a lower body 120 are coupled to each other by a rear main hinge hm, as illustrated in FIG. 3.

The locking mechanism illustrated in FIG. 3 includes: a latch member 131 which is installed to ascend and/or descend on a guide 111 installed inside the upper body 110. A locking hole perforation 131*a* is formed in the latch member 131, and a bent portion 131*c* is slantingly disposed at a lower end of the latch member 131 which is made of a ferromagnetic material. The latch member is retracted into the upper body 110 when the upper body 110 is raised away from the lower body 120, and the latch member protrudes from the upper body 110 when the upper body 110 is lowered close to the lower body 120. A restoration member 132 provides a restoration force to the latch member 131 so as to urge latch member 131 into the upper body 110. A hook member 133 is rotatable about hinge h inside the lower body 120. Hook member 133 has a hook portion 133*a* whose upper end is formed to engage the locking hole 131*a*. A magnet 134 is installed at the hook member 133 under the hook portion 133*a*. A push button 135 protrudes from a side portion of the lower body 120 and pushes the hook member 133 so that the hook portion 133*a* engaging the locking hole 131*a* can be disengaged therefrom.

In addition, the hook member 133 is rotatable with respect to the hinge h may be directly hinge-coupled to the hinge h. However, in the present embodiment, the hook member 133 may be coupled to additional support 113 which is in turn coupled to the hinge h and to a spring 114 for providing an elastic force so as to enable the support 113 to be restored to its initial position as illustrated in FIG. 4.

The latch member 131 may protrude from a latch hole 110*a* formed in the lower side of upper body 110. The latch hole 110*a* provides a rotation space so that the latch member 131 can be rotated in a direction in which it engages in the hook portion 131*a*. When engaged the latch hole 110*a* is inclined toward the latch member 131 and only one side of the latch member 131 is guided to one side wall 110*a'* inside the latch hole 110*a*.

In order to explain the operation of the locking mechanism according to the present invention, a latch member 131, restoration members 132 and 132', and a hook member 133 are magnified in FIGS. 5, 6, and 7. The left drawing is a front view of the expanded latch member 131, the restoration members 132 and 132', and the hook member 133, and the right drawing is a side view of the left drawing.

Wings 131*b* are disposed about both sides of latch member 131, each wing having a through hole formed therein. The through hole is disposed over guide 11. Accordingly, the latch member 131 may ascend and descend where the wings 131*b* are guided to the guide 111. The latch member 131 is made of a ferromagnetic material, such as steel, so that the latch member 131 can be urged to descend by a magnetic force of the magnet 134 installed at the hook member 133.

If a burr remains in the through hole formed in the wing 131*b*, the burr may affect the restoration action of a spring having a weak elastic force, causing potential operating defects. Thus, the wing 131*b* in which the through hole is formed may be manufactured through a well-known in-mold method.

The bent portion 131*c* is implemented by being slantingly bent toward a front direction of the hook member 133. The bent portion 131*c* guides the latch member 131 forwardly while it comes in contact with the hook portion 133*a* when the latch member 131 descends, and accordingly, the hook portion 133*a* is smoothly engaged with the locking hole 131*a*. In addition, the bent portion 131c also plays a role for increasing the effect by the magnetic force by enlarging the surface area which magnetic flux from the magnet 134 effects.

In addition, the locking hole 131a formed in the latch member 131 has a substantially rectangular shape in the present embodiment. However, the skilled in the art will recognize that the shape of the locking hole 131a does not restrict the scope of the present invention.

The restoration member 132 urges the latch member 131 to be restored to its initial position inside the upper body 110 and may be implemented in various shapes such as a springs, magnets, and the like.

In detail, the restoration member 132 is installed at the guide 111 and may be implemented as a coil spring for supporting the wing 131b in an upward direction. In this case, the coil spring may have a conical shape. In this case, even when the spring is compressed, there is an advantage that the operating range of the latch member 131 is not affected by the thickness of the spring. In this way, the restoration member 132 is implemented as the spring so that it provides a restoration force (elastic force) to the wing 131b and enables the latch member 131 to be inserted into the upper body 110 when disengaged.

In addition, the restoration member 132' may be implemented as a magnet fixed on the upper body 110 or the latch member 131, as illustrated in FIG. 7. In this case, the restoration member 132' comprising a magnet, attract the latch member 131, so that the latch member 131 is retained in the upper body 110. The strength of a magnetic force generated in the restoration member 132' should be smaller than the strength of a magnetic force of the magnet 134 installed at the hook member 133.

The hook portion 133a having a bent shape that selectively engages the locking hole 131a is formed at the upper end of the hook member 133.

Through the above structure, when the upper body 110 and the lower body 120 are separated from each other, the state where the latch member 131 is disposed within the upper body 110 is maintained by the restoration force (elastic force or magnetic force) of the restoration member 132 or 132'.

When the upper body 110 is rotated about the main hinge hm and is brought to close proximity with the lower body 120, the distance between the latch member 131 and the hook member 133 becomes narrow and accordingly, the latch member 131 is pulled by the magnetic force of the magnet 134 installed at the hook member 133. Then, the latch member 131 descends and engages the hook portion 133a through the locking hole 131a of the hook member 133, as illustrated in FIG. 6. In this state, a locking engagement maintain the upper body in a closed state relative to the lower body.

When the upper body 110 is opened, the push button 135 installed at the lower body 120 is pressed. Then, the hook member 133 is pushed, the hook portion 133a is separated from the locking hole 131a and the upper body 110 can be opened.

A locking mechanism according to another embodiment of the present invention will now be described.

Figure 8:
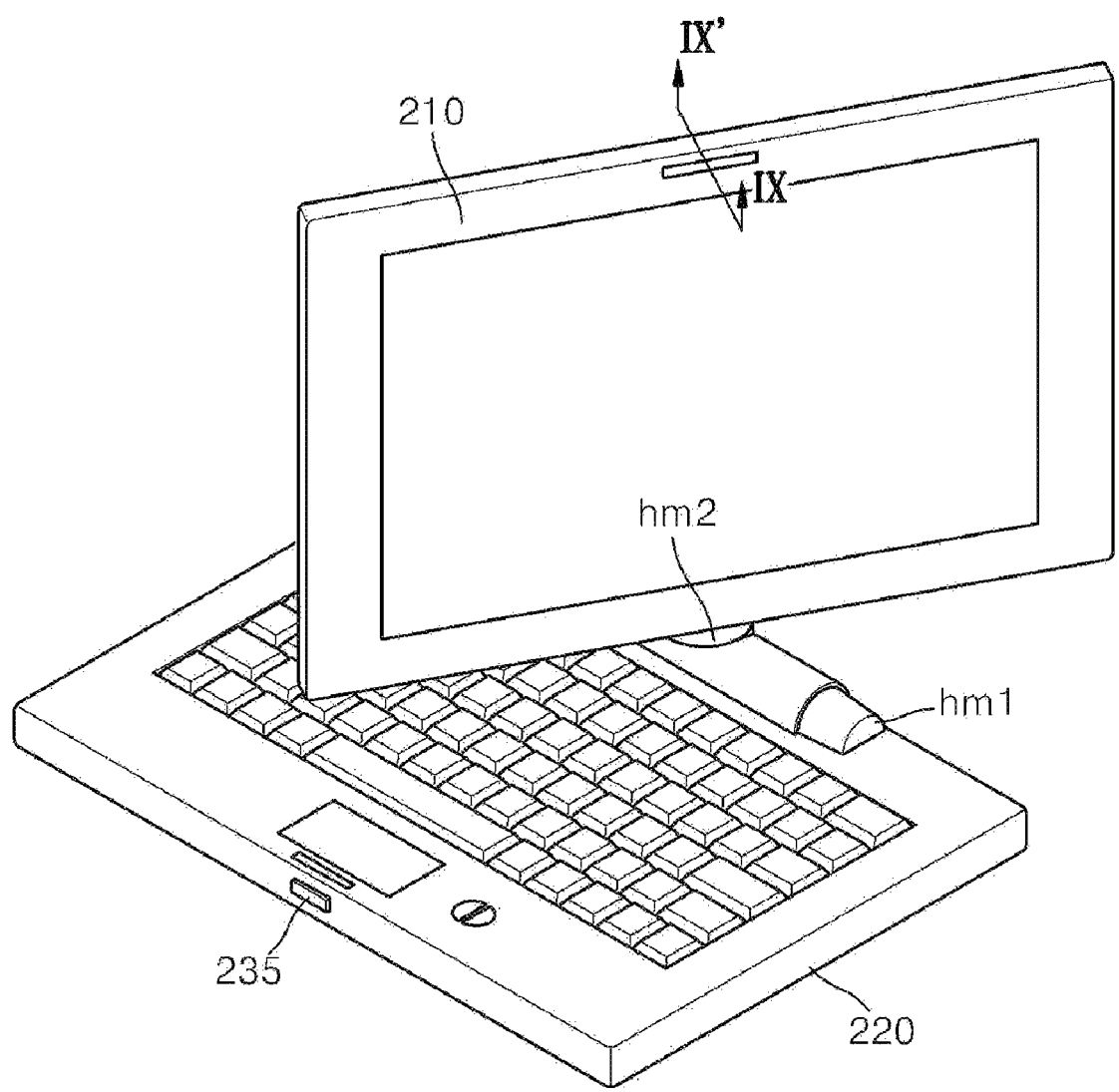
FIG. 8 is a perspective view of a locking mechanism for a swivel flat display device according to another embodiment of the present invention.
Figure 9:
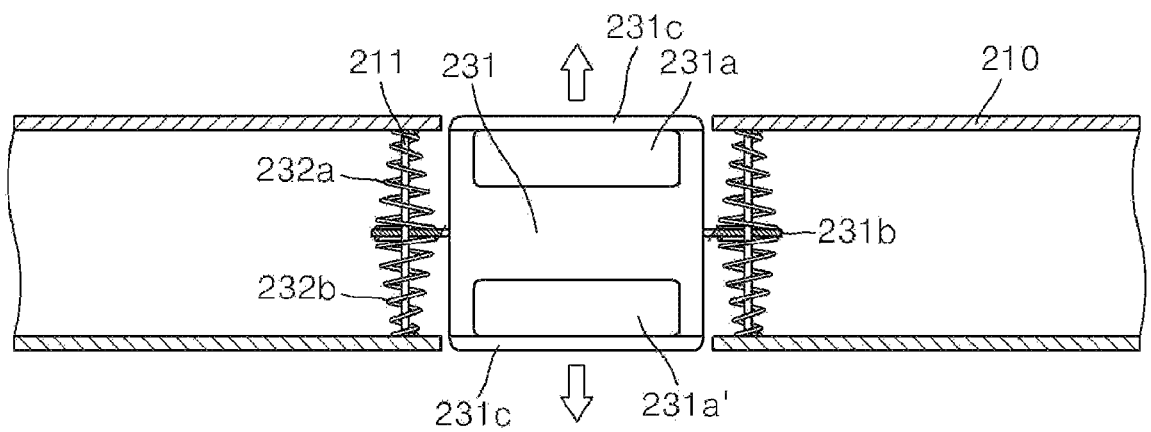
FIG. 9 is an expanded diagram of the main structure of an upper body of FIG. 8, for illustrating the case where a restoration member is a spring type.
Figure 10:
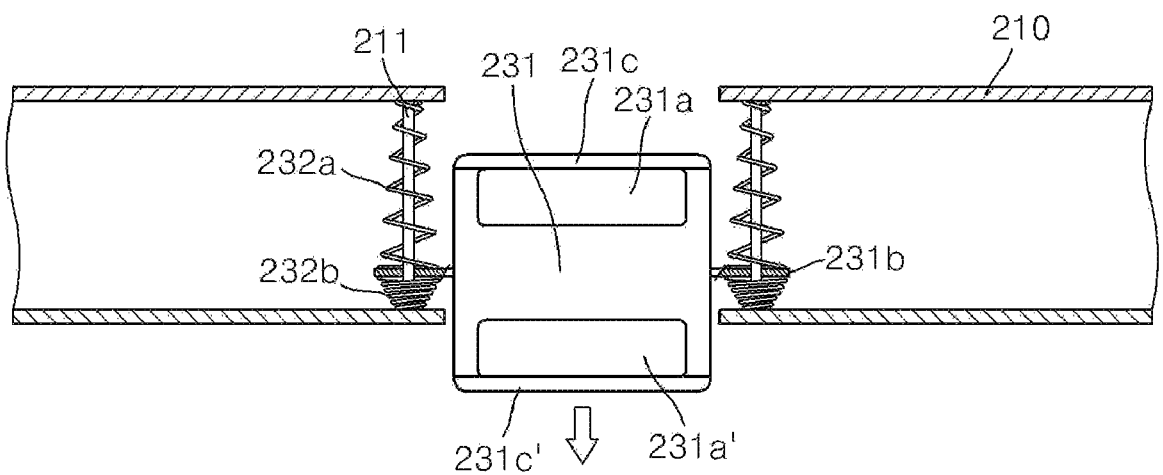
FIGS. 10 and 11 are diagrams for illustrating the case where a latch member of FIG. 9 is protruded from the upper surface or lower surface of the upper body.
Figure 11:
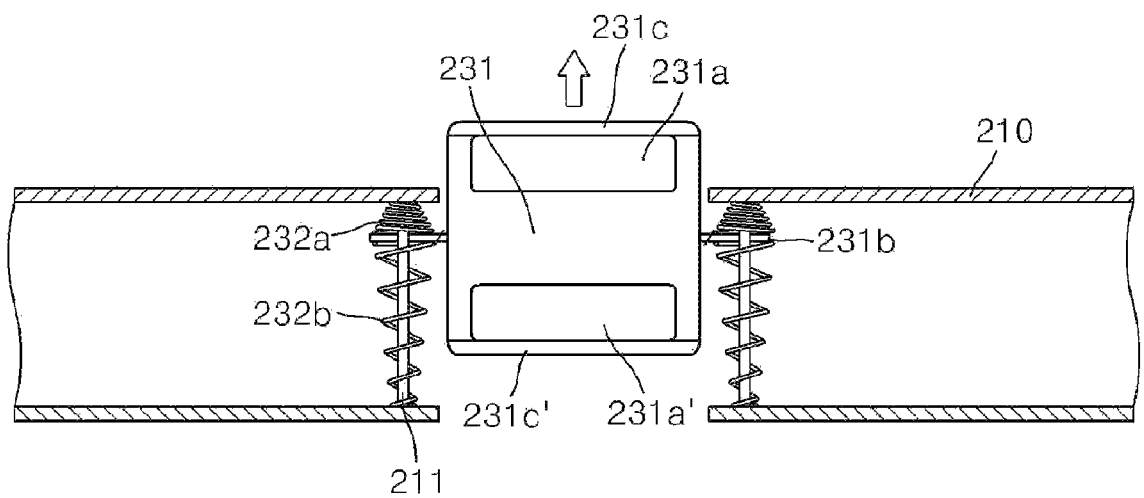
Figure 12:
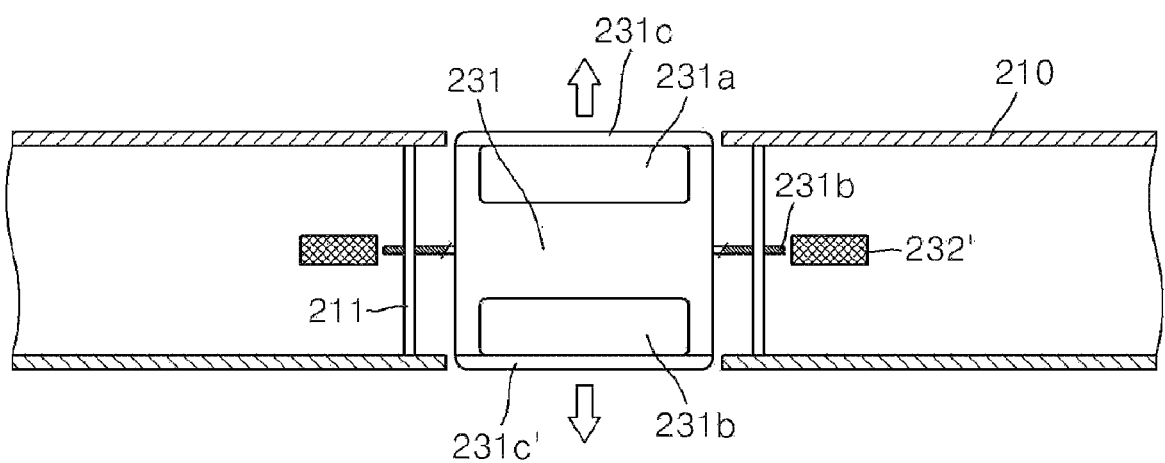
FIG. 12 is an expanded diagram of the main structure of the upper body of FIG. 8, for illustrating the case where the restoration member is a magnet type.

FIG. 8 is a perspective view of a locking mechanism for a swivel flat display device according to another embodiment of the present invention. In addition, FIG. 9 is an expanded diagram of the main structure of an upper body of FIG. 8, for illustrating the case where a restoration member is a spring type, FIGS. 10 and 11 are diagrams for explaining the case where a latch member of FIG. 9 protrudes from the upper surface or lower surface of the upper body, and FIG. 12 is an expanded diagram of the main structure of the upper body of FIG. 8, for illustrating the case where the restoration member is a magnet type.

The locking mechanism according to another embodiment of the present invention is applied to a swivel flat display device in which an upper body 210 and a lower body 220 are coupled to each other by two rear main hinges hm1 and hm2, wherein the upper body 210 is rotatable by 180 degrees with respect to the lower body 220 about a first axis and the top may be opened and closed about a second axis, as illustrated in FIG. 8.

The locking mechanism illustrated in FIG. 8 comprises a latch member 231 constructed to ascend and descend on a guide 211 installed inside the upper body 210. A pair of locking holes 231a and 231a' are formed in the latch member 231. Latch member 231 further have bent portions 231c and 231c' are slantingly bent at respective ends of the latch member 231 of a ferromagnetic material. The latch member 231 is retracted into the upper body 210 in the disengaged, i.e. retracted state. The latch member 231 protrudes from the upper surface when the upper body 210 is lowered toward lower body 220. Also, the latch member 231 moves back into the upper body when the upper body 210 is raised. Restoration members 232a, 232b, and 232' which provide restoration forces to the latch member 231 so that the latch member 231 can be moved from a deployed state (protruding from the upper surface of upper body 210) to a retracted state within the upper body.

A hook member 233 is rotatable about a hinge h in which a hook portion 233a is formed. The hook portion engages locking holes 231a and 231a'. A magnet 234 is installed at the hook member 233 under the hook portion 233a. A push button 235 protrudes from a side portion of the lower body 220. When pushed, the push button 235 pushes the hook member 233 so as to disengage the hook member from any of locking holes 231a and/or 231a'. The hook member 233 which is rotated about the hinge h, may be constructed to be directly coupled to the hinge h. However, as illustrated in FIG. 4, the skilled in the art will recognize that the hook member 233 may be constructed with an additional support 213 coupled to the hinge h and a spring 214 for providing an elastic force so as to enable the support 213 to be restored to its initial position and where the hook 233 is coupled to the support 213. The hook member 233, the magnet 234, and the push button 235 installed inside the lower body 220 are the similar elements to the hook member 133, the magnet 134, and the push button 135 described in the previous embodiment and thus, a detailed description of the hook member 233, the magnet 234, and the push button 235 will be omitted.

In order to explain the operation of the locking mechanism according to the present invention, only the latch member 231 and the restoration members 232a, 232b, and 232' are expanded in FIGS. 9 through 12.

Wings 231b are disposed about both sides of latch member 231, each wing having a through hole formed therein. The through hole is disposed over the guide 211. Accordingly, the latch member 231 may ascend and descend where the wings 231b are guided to the guide 211. The latch member 231 is made of a ferromagnetic material, such as steel, so that the latch member 231 can be urged to ascend by a magnetic force of the magnet 234 installed at the hook member 233.

If a burr remains in the through holes formed in the wings 231b and 231b', such burr may affect the restoration action of a spring having a weak elastic force, potentially causing operating defects. Thus, the wing 231b and 231b' in which the through holes are formed may be manufactured through a well-known in-mold method.

The locking holes 231a and 231a' in the latch member 231 face each other with respect to the wing 231b. The locking holes 231a and 231a' have a rectangular shape in the present embodiment. However, the skilled in the art will readily recognize that the shape of the locking holes 231a and 231a' does not restrict the scope of the present invention.

The bent portions 231c and 231c' are implemented by being slantingly bent toward a front direction of the hook member 233. The bent portions 231c and 231c' are similar to the bent portion 131c described in the previous embodiment and thus, a further detailed description thereof will be omitted.

The restoration members 232a, 232b, and 232' provide restoration forces so that the latch member 231 is urged into the initial position inside of the upper body 210 while retracted, and may be implemented in various shapes.

In detail, the restoration members 232a and 232b may be implemented as coil springs respectively installed at both sides of the guide 211 centering on, and supporting the wing 231b, as illustrated in FIGS. 9, 10, and 11. In this case, the coil spring may have a conical shape. In this case, even when the spring is compressed, there is an advantage that the operating range of the latch member 231 is not affected by the thickness of the spring. In this way, the restoration members 232a and 232b are implemented as the springs so that they provide restoration forces (elastic forces) to the wing 231b and enable the latch member 231 to be positioned in the middle of the guide 211 when disengaged. Accordingly, the latch member 231 is retracted into the upper body 210.

The restoration member 232' may be implemented as a magnet fixed proximally to latch member 231 approximately in the middle of the upper body 210 so that the latch member 231 can be maintained in the retracted position, as illustrated in FIG. 9. In this case, the magnetic restoration member 232' urges the latch member 231 into the upper body 210 while in the disengaged, or retracted state. in that state, the strength of a magnetic force generated in the restoration member 232' should be smaller than the strength of a magnetic force of the magnet 234 installed at the hook member 233.

The hook portion 233a having a bent shape that selectively engages the locking holes 231a and 231a' is formed at the upper end of the hook member 233. The hook member 233 is supported by the support 213 supported by the hinge h on the lower body 220, and the support 213 is maintained at its initial position by the spring 214.

Through the above structure, when the upper body 210 and the lower body 220 are separated from each other, the restoration members 232a, 232b, and/or 232' apply restoration forces (elastic forces or magnetic forces) to the latch member 231 so that the latch member 231 is positioned approximately in the middle of the guide 211 and accordingly, the latch member 231 is maintained at the retracted state, as illustrated in FIGS. 9 and 12.

When the upper body 210 is rotated about the two main hinges hm1 and hm2 and is brought to close proximity to the lower body 220, a distance between the latch member 231 and the hook member 233 becomes sufficiently small, so that the latch member 231 is pulled by the magnetic force of the magnet 234 installed at the hook member 233. Then, the latch member 231 extends from the lower surface of the upper body 210, as illustrated in FIG. 10, or the latch member 231 protrudes from the upper surface of the upper body 210, as illustrated in FIG. 11, and accordingly, the hook portion 233a of the hook member 233 engages in the locking holes 231a and 231a' in a similar manner to the manner described in the previous embodiment. In this state, the upper body 210 is maintained at locking engagement to the lower body 220.

When the upper body 210 is opened, the push button 235 installed at the lower body 220 is pressed, as illustrated in FIG. 4. Then, the hook member 233 is pushed, the hook portion 233a is separated from the locking holes 231a and 231a' and the upper body 210 can be opened.

As described above, the locking mechanism for a flat display device according to the present invention includes a latch member which selectively protrudes from the surface of the upper body and in which a locking hole is formed. A restoration member provides a restoration force so that the latch member is urged to stay retracted in the upper body. A hook member which is installed at the lower body has a hook portion constructed to engage the latch member protruding from the surface of the upper body. A magnet is installed at the hook member. A push button separates the hook portion from the locking hole such that, although shock or strong magnetic force may be applied from the outside, a locking operation can be positively achieved in the state where the upper body and the lower body are folded.

In addition, since a space for hook rotation required in conventional locking mechanism is not required in accordance with the above described embodiments, restrictions in designing the upper body and the lower body can be eliminated, and problems stemming from the occurrence of defects caused by foreign substances can be solved.

Through the above structure, the locking mechanism according to the present invention can also be applied to both a single-axis rotation flat display device and a swivel flat display device.

While the present invention has been particularly shown and described with reference to exemplary embodiments thereof, it will be understood by those of ordinary skill in the art that various changes in form and details may be made therein without departing from the spirit and scope of the present invention.

What is claimed is:

1. A locking mechanism for a single axis rotation flat display device in which an upper body and a lower body are coupled to each other by a rear main hinge, the locking mechanism comprising:

A guide disposed in said upper body;

a latch member disposed is said upper body and being movably guided by said guide so as to at least partially protrude from said upper body in a deployed state, or substantially retract into said upper body in a retracted state, said latch member having a locking hole formed therein, said latch member further having a slantingly bent portion disposed at or about an extremity thereof, said latch member comprising a ferromagnetic material;

A restoration member disposed in said upper body for urging said latch member into a retracted state;

A hook member hingedly disposed at said lower body, the hook member having a hook portion at an upper end, and constructed to engage said locking hole;

A first magnet disposed proximally or at said hook member; and,

A push button protruding from a side portion or the lower body, said push button being coupled to said hook member so as to disengage said hook portion from said locking hole when said pushbutton is activated.

2. The locking mechanism of claim 1, wherein the latch member 131 has a rectangular shape when viewed from the front.

3. The locking mechanism of claim 1, further comprising:
a support coupled to said hinge inside said lower body; and
a spring providing an elastic force to urge said support to its initial position;

wherein said hook member is coupled to said support.

4. The locking mechanism of claim 1, wherein said latch member further comprises at least one wing having a through hole formed therein, said through hole disposed to, at least partially, encircle said guide.

5. The locking mechanism of claim 4, wherein said restoration member comprises a spring installed at said guide, and urges said wing in an upward direction.

6. The locking mechanism of claim 1, wherein, said restoration member comprises a second magnet fixed on the upper body, wherein the strength of a magnetic force generated by said restoration member is smaller than the strength of a magnetic force of said first magnet.

7. A locking mechanism for a swivel flat display device in which an upper body and a lower body are coupled to each other by two main hinges, wherein said upper body is rotatable by 180 degrees about a first axis with respect to the lower body and wherein the upper body may be opened and closed relative to the lower body about a second axis the locking mechanism comprising:

a guide disposed in said upper body;

a latch member being movably guided by said guide so as to at least partially protrude from said upper body in a deployed state, or substantially retract into said upper body in a retracted state, said latch member having a pair of locking holes formed therein, said latch member at least bent portions slantingly bent at or about opposing extremities thereof, said latch member comprising a ferromagnetic material;

a plurality of restoration members disposed in said upper body for urging said latch member into a retracted state;

A hook member hingedly disposed at said lower body, the hook member having a hook portion at an upper end, and constructed to engage one of said locking holes at a time;

A first magnet disposed proximally or at said hook member; and,

A push button protruding from a side portion or the lower body, said push button being coupled to said hook member so as to disengage said hook portion from said locking hole when said pushbutton is activated.

8. The locking mechanism of claim 7, wherein said latch member is formed to have a rectangular shape when viewed from the front.

9. The locking mechanism of claim 7, further comprising:

a support coupled said the hinge inside said lower body; and a spring providing an elastic force to urge said support to its initial position;

wherein said hook member is coupled to the support.

10. The locking mechanism of claim 9, wherein said latch member further comprises at least one wing having a through hole formed therein, said through hole disposed to at least partially encircle said guide.

11. The locking mechanism of claim 10, wherein said restoration members comprise a plurality of springs respectively installed at both sides of said guide providing support for said wing, and urging it towards a center position where said latch member is disposed in said retracted state.

12. The locking mechanism of claim 7, wherein said restoration member comprises a second magnet fixed on the upper body wherein the strength of a magnetic force generated by said restoration member is smaller than the strength of a magnetic force of said first magnet.

* * * * *